(12) United States Patent
Kobayashi et al.

(10) Patent No.: US 8,937,471 B2
(45) Date of Patent: Jan. 20, 2015

(54) DISCHARGING CIRCUIT AND POWER SUPPLY

(75) Inventors: Junya Kobayashi, Suntou-gun (JP); Minoru Hayasaki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 13/372,334

(22) Filed: Feb. 13, 2012

(65) Prior Publication Data

US 2012/0207505 A1 Aug. 16, 2012

(30) Foreign Application Priority Data

Feb. 16, 2011 (JP) ................... 2011-031038

(51) Int. Cl.
| | | |
|---|---|---|
| *H02M 7/06* | (2006.01) | |
| *H02M 1/32* | (2007.01) | |
| *H02M 1/12* | (2006.01) | |

(52) U.S. Cl.
CPC .......... *H02M 1/32* (2013.01); *H02M 2001/322* (2013.01)
USPC ............. 323/299; 363/125; 399/88; 320/166; 323/242

(58) Field of Classification Search
CPC .......................... H02M 1/32; H02M 2001/322
USPC ......... 320/166; 363/39, 44, 125, 126; 399/88; 323/288, 237, 239, 242, 905, 299
See application file for complete search history.

(56) References Cited

U.S. PATENT DOCUMENTS

| | | | |
|---|---|---|---|
| 4,272,805 A | 6/1981 | Iguchi | |
| 5,283,516 A * | 2/1994 | Lohoff | ........................... 323/322 |
| 6,314,004 B1 | 11/2001 | Higuchi | |
| 6,424,125 B1 * | 7/2002 | Graham | ........................ 320/166 |
| 7,428,391 B2 | 9/2008 | Kobayashi | |
| 8,208,233 B2 * | 6/2012 | Lin | ................. 361/56 |
| 8,305,047 B2 * | 11/2012 | Lin et al. | ........................ 320/166 |
| 2010/0321104 A1* | 12/2010 | Busch | ........................... 327/552 |
| 2011/0025278 A1* | 2/2011 | Balakrishnan et al. | ........ 320/166 |
| 2011/0096052 A1* | 4/2011 | Kim | ............................... 345/211 |
| 2011/0122668 A1* | 5/2011 | Lo et al. | ........................ 363/126 |

FOREIGN PATENT DOCUMENTS

| | | |
|---|---|---|
| CN | 100517095 C | 7/2009 |
| CN | 101540503 A | 9/2009 |
| EP | 2267875 A2 | 12/2010 |
| JP | 2001-095261 A | 4/2001 |
| JP | 2005-201587 A | 7/2005 |
| JP | 2006-204028 A | 8/2006 |
| JP | 2011-010295 A | 1/2011 |

* cited by examiner

*Primary Examiner* — Gary L Laxton
(74) *Attorney, Agent, or Firm* — Canon USA Inc IP Division

(57) ABSTRACT

A discharging circuit includes a filter unit connected between the input lines of a commercial AC power supply, a switch whose operations are controlled by the filter unit; and a discharging unit which discharges voltage of the capacitance element when the switch unit is turned on.

21 Claims, 15 Drawing Sheets

DISCHARGING CIRCUIT AND POWER SUPPLY

BACKGROUND OF THE INVENTION

1. Field of the Invention

The present invention relates to power supplies which allow reduction of power consumption by electronic apparatuses and particularly relates to discharging circuits which can quickly emit remaining charges in a capacitor for noise reduction in a power supply.

2. Description of the Related Art

With reference to FIG. 17A, a discharging circuit will be described which is in an electronic apparatus having a power supply (hereinafter, also called a converter) which receives input of AC voltage from a commercial AC power supply. In a converter which receives input of AC voltage, an X capacitor 40 (popularly called an across-the-line capacitor) which functions as a capacitance element for external noise reduction (also called noise prevention) is generally connected between lines from a commercial AC power supply. For the security after removal of a plug (also called AC plug) by a user, discharging the X-capacitor 40 may be required within one second to a predetermined voltage or lower after the plug is removed. This is provided under Electrical Appliance and Material Safety Act, International Electrotechnical Commission (IEC) and so on, for example. In order to satisfy the specifications, when the X-capacitor 40 is used, a discharging circuit including a discharge resistance 20 is generally provided in parallel with the X-capacitor 40 as illustrated in FIGS. 17A and 17B.

In a converter in a general electronic apparatus, a rectifying unit 8 in the subsequent stage of a discharging circuit performs full-wave rectification on AC voltage, and a converter unit 9 converts it to a voltage for components of the electronic apparatus and supplies it to them. In order to determine the frequency of AC voltage of a commercial AC power supply or detect a power failure instantly, some electronic apparatuses may have a zero-crossing detecting circuit which detects a zero-crossing point of an AC voltage. Such an apparatus may often use a zero-crossing detecting circuit instead of the discharging circuit.

On the other hand, recent electronic apparatuses have been required to reduce power consumption while the electronic apparatuses are not being operated at a standby state, that is, in a operation standby mode in consideration of environment, for example. Here, for example, when the X-capacitor 40 has a capacitance of 1.0 µF, the requested value of the discharge resistance 20 of the discharging circuit is equal to or lower than 1 MΩ. For example, when commercial power supply voltage is AC 230 V, the power consumption by the discharge resistance is about 52.9 mW. The power consumption is not ignorable in an operation standby mode. A discharging circuit or the zero-crossing detecting circuit having the X-capacitor 40 and the discharge resistance 20 consumes power at all times because current is fed to the discharge resistance of the discharging circuit independent of the driving state of the electronic apparatus.

For example, according to Japanese Patent Laid-Open No. 2005-201587, a zero-crossing detecting circuit is turned on and off in an operation standby mode to reduce the proportion of the ON period. If the zero-crossing detecting circuit detects removal of the AC plug, the proportion of the ON period is increased more than the operation standby mode (or keeps the ON state). This may reduce the time for discharging residual electric charges by the X-capacitor 40 and may reduce the power consumption by the zero-crossing detecting circuit in the operation standby mode.

According to a different circuit configuration from Japanese Patent Laid-Open No. 2005-201587, a standby-only power supply 11 may be provided separately from the main power supply 12, for example, as illustrated in FIG. 17B. In an operation standby mode, a line from a commercial power supply of the main power supply 12 may be turned off to disconnect an X capacitor 44. In FIG. 17B, discharge resistances 20 and 30 and X capacitors 40 and 44 are provided. In a normal operation mode, power is supplied from the main power supply 12. In the operation standby mode, the main power supply 12 is turned off by a switch 73, and power is supplied from the standby-only power supply 11. In the operation standby mode, the electronic apparatus requiring a small amount of power may allow a lower capacitance of the X-capacitor 40 than that of the X-capacitor 44. In other words, the discharge resistance 20 may be larger, and the power consumption in the standby mode may be reduced.

As described above, circuits configured to discharge an X capacitor are devised for reduction of power consumption. However, because the configuration of Japanese Patent Laid-Open No. 2005-201587 uses a zero-crossing detecting circuit also as a discharging circuit, the zero-crossing detecting circuit may not be turned off in all periods. In other words, power is consumed which depends on the ON period of the zero-crossing detecting circuit. Further, because of the period when the zero-crossing detecting circuit is turned off, when external noise changes the AC voltage a commercial AC power supply, there may be a risk to mis-detect the timing of zero-crossing or there may be a risk that some timings may occur at which zero-crossing is not detectable.

A circuit configuration 10 may be considered which has a special power supply 11 for a standby mode as illustrated in FIG. 8. However, even in a standby mode, an X-capacitor may often be required. Assuming the capacitance of the X-capacitor is equal to 1.0 µF, the required discharge resistance is 1 MΩ. In this case, the power consumption by the discharge resistance is about 52.9 mW when the AC voltage of the commercial AC power supply is AC 230 V. When the capacitance of an X-capacitor in the circuit configuration 10 having the special power supply 11 for a standby may be reduced to 0.22 µF, the required discharge resistance is equal to or lower than about 4.5 MΩ. The power consumption by the discharge resistance is about 11.8 mW when the AC voltage of the commercial AC power supply is AC 230 V. The configuration has limitations to further reduce the power consumption during a standby mode though the power consumption may be reduced more than configurations in the past. The circuit configuration having the special power supply 11 for a standby mode naturally has more circuit components of the special power supply, increasing the circuit costs.

The present invention was made in view of the problem and may reduce power consumption in a standby mode with an inexpensive configuration and allows quick discharge of residual electric charges when power supply from a commercial power supply shuts down because of removal of a plug, for example.

SUMMARY OF THE INVENTION

A discharging circuit according to an aspect of the present invention which discharges voltage of a capacitance element for noise reduction connected between input lines for AC voltage to be input from a commercial AC power supply includes a filter unit connected between the input lines, a switching unit whose operations are controlled by the filter unit, and a discharging unit which discharges voltage of the capacitance element when the switching unit is turned on.

A discharging circuit according to another aspect of the present invention which discharges voltage of a capacitance element for noise reduction connected between input lines for AC voltage to be input from a commercial AC power supply includes a rectifying unit connected between the input lines, a discharging unit connected to the rectifying unit, a filter unit connected to the discharging unit, and a switching unit whose operations are controlled by the filter unit. In this case, the discharging unit discharges voltage of the capacitance element when the switching unit is turned on.

A power supply according to another aspect of the present invention which rectifies and smoothes AC voltage input from a commercial AC power supply and outputs voltage includes a rectifying unit which rectifies the input AC voltage, a capacitance element for noise reduction connected between the rectifying unit and an input unit for the AC voltage, and a discharging circuit provided between the capacitance element and the rectifying unit. In this case, the discharging circuit has a filter unit connected between the input lines, a switching unit whose operations are controlled by the filter unit, and a discharging unit which discharges voltage of the capacitance element when the switching unit is turned on.

A power supply according to another aspect of the present invention which rectifies and smoothes AC voltage input from a commercial AC power supply and outputs voltage includes a rectifying unit which rectifies the input AC voltage, a capacitance element for noise reduction connected between the rectifying unit and an input unit for the AC voltage, and a discharging circuit provided between the capacitance element and the rectifying unit, wherein the discharging circuit has a rectifying unit connected between the input lines, a discharging unit connected to the rectifying unit, a filter unit connected to the discharging unit, and a switching unit whose operations are controlled by the filter unit, and the discharging unit discharges voltage of the capacitance element when the switching unit is turned on.

Further features of the present invention will become apparent from the following description of exemplary embodiments with reference to the attached drawings.

DESCRIPTION OF THE EMBODIMENTS

Configurations and operations of the present invention will be described below. It should be noted that the following embodiments will be given for illustration purpose only and it is not intended to limit the technical scope of the present invention thereto. The modes for embodying the present invention will be described below in further detail with reference to drawings and embodiments.

Figure 1:
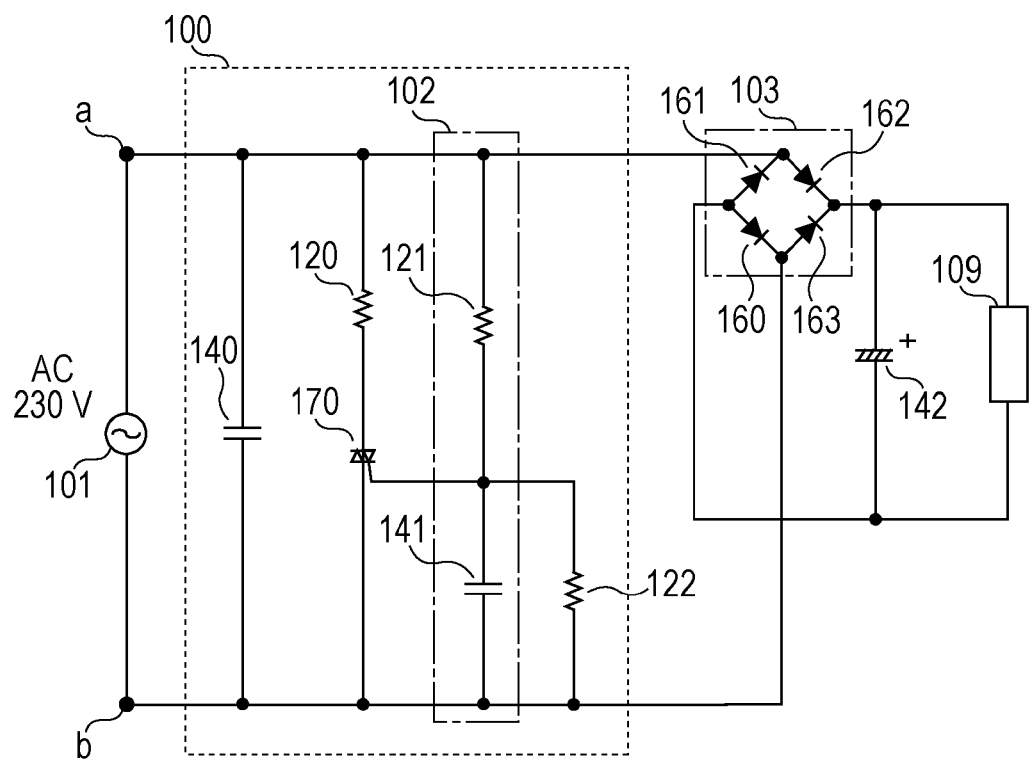
FIG. 1 illustrates a discharging circuit according to a first embodiment.

A first embodiment will be described. FIG. 1 illustrates a configuration of a discharging circuit in a power supply apparatus according to a first embodiment. A discharging circuit 100 in FIG. 1 includes a capacitance element for noise reduction, a discharging unit which discharges voltage of a capacitance element, and a filter unit. Referring to FIG. 1, the discharging circuit 100 includes an X capacitor 140 that is a capacitance element for noise reduction, a discharge resistance 120 that is a discharging unit, a filter circuit 102 having a capacitor 141 and resistance element 121 (hereinafter, also called a resistance) serially connected as a filter unit, a two-way switch element 170 that is a switching unit having a control terminal which brings the discharge resistance 120 into conduction, and a resistance 122. A plug (also called an AC plug) of a commercial AC power supply (AC 230 V) is connected to a contact a and a contact b (between input lines of the AC voltage) that are input units for AC voltage. The two-way switch element 170 may be a switch element which allows bidirectional flow of current, such as a bidirectional thyristor represented by the circuit illustrated in FIG. 1, for example. Any element which allows bidirectional flow of current is applicable though a bidirectional thyristor is applied in this embodiment. A plurality of elements which allow current flow in one direction, such as a transistor, may be connected.

Generally, a diode bridge 103 including diodes 162, 163, 164, and 165, which is a rectifying unit, is connected in a subsequent stage of the commercial AC power supply 101. Input AC voltage having undergone full-wave rectification is smoothed by a smoothing capacitor 142 in the subsequent stage. A converter (such as AC-DC converter) 109 is connected in the subsequent stage thereof. In FIG. 1, AC voltage supplied from the commercial AC power supply, rectified and smoothed is used. This embodiment is also applicable to an electronic apparatus which allows direct application of AC voltage from the commercial AC voltage, without rectifying and smoothing.

The reduction of power consumption by operations by the discharging circuit of the first embodiment will be described in details below.

AC voltage from the commercial AC power supply is applied across the filter circuit 102 in the discharging circuit 100 in FIG. 1. Setting the time constant by the resistance 121 and the capacitor 141 sufficiently longer than the cycle of AC voltage may sufficiently lower the voltage across the capacitor 141 than the AC voltage. The two-way switch element 170 is not brought into conduction if the peak value of the voltage across the capacitor 141 is lower than the ON threshold value of the two-way switch element 170 when the voltage across the capacitor 141 has the peak value. As a result, the resistance 121 and resistance 122 are only connected across the X-capacitor 140. Setting the values of the resistance 121 and resistance 122 sufficiently higher may reduce the power consumption by the discharge resistance.

For example, like the values described with reference to FIG. 7, when the capacitance of the X-capacitor 14 is 1.0 μF, the required discharge resistance 20 may be 1 MΩ. The power consumption by the discharge resistance 20 is about 52.9 mW when the AC voltage from the commercial AC power supply is 230 V. On the other hand, according to this embodiment, when the capacitance of the X-capacitor 140 is 1.0 μF, the resistance 121 is 20 MΩ, and the AC voltage from the commercial AC power supply is also 230 V, the power consumption by the resistance 121 is about 2.6 mW. In other words, the effect of decreasing the power consumption by this embodiment against the conventional configurations is equal to 50.3 mW (about 52.9 mW–about 2.6 mW).

On the other hand, when the AC plug is removed, it may be required to reduce the voltage across the male fitting of the AC plug to a predetermined voltage or lower within one second (which is provided under Electrical Appliance and Material Safety Act and International Electrotechnical Commission (IEC), for example). However, at the instance of the removal of the AC plug, the X-capacitor 140 stores charges, and the voltage across the X-capacitor 140 is roughly attenuated in the time constant of the capacitance of the capacitor 141 and the resistance 121. Because the resistance value (the value of discharge resistance) of the resistance 121 is set higher as described above, the voltage across the X-capacitor 140 is substantially direct current.

On the other hand, the voltage across the capacitor 141 increases exponentially with the passage of time. When the voltage exceeds the ON threshold value of the two-way switch element 170, the discharge resistance 120 is brought into conduction. Thus, the residual electric charges of the X-capacitor 140 are emitted. According to this embodiment, the two-way switch element 170 is turned on and the time for emitting the residual electric charges of (or voltage across) the X-capacitor 140 to the value lower than a required predetermined voltage $V_{reg}$ by the discharge resistance 120 is kept within one second. Next, a scheme for emitting the residual electric charges of the X-capacitor 140 within one second will be described in detail.

First, it is defined that the voltage across the capacitor 141 after the AC plug is removed is $V_{C1}(t)$ as a function of time t, the capacitance of the capacitor 141 is $C_1$, the resistance value of the resistance 121 is $R_1$, and the voltage across the X-capacitor 140 at the instance (t=0) of the removal of the AC plug is $V_{dc}$. The change of the voltage across the capacitor 141 with the passage of time, $V_{C1}(t)$, is given by Expression 1.

$$V_{C1}(t) = V_{dc}(1 - e^{\frac{t}{R_1 \cdot C_1}}) \quad (1)$$

Defining that the time until the two-way switch element 170 is turned on is $t=t_{det}$ and the voltage across the X-capacitor 140 is $V_{CX}(t_{det})=V_{C1th}$, the time $t_{det}$ until the two-way switch element 170 is turned on may be given by Expression 2.

$$t_{det} = R_1 \cdot C_1 \cdot \log_e\left(\frac{V_{dc}}{V_{dc} - V_{C1th}}\right) \quad (2)$$

According to Expression 2, time $t_{det}$ depends on $R_1$, $C_1$, and $V_{C1th}$. The voltage across the X-capacitor 140, that is, the voltage between AC lines after the two-way switch element 170 is turned on may be given by Expression 3.

$$V_{CX}(t) = V_{dc} \cdot e^{-\frac{t - t_{det}}{R_0 \cdot C_X}} \quad (3)$$

where the capacitance of the X-capacitor is $C_X$ and the resistance value of the discharge resistance 120 is $R_0$ as the function $V_{CX}(t)$ of the time. Expression 3 is satisfied during a period from $t=t_{det}$ until the two-way switch element is turned off again.

After removal of the AC plug, $V_{CX}(t)$ may be required to reduce to the predetermined voltage $V_{reg}$ or lower. In order to do so, the resistance value $R_0$ of the discharge resistance 120 and/or the time $t_{det}$ until the two-way switch element 170 is turned on is/are set to satisfy Expression 4.

$$V_{CX}(1) \leq V_{reg} \quad (4)$$

Figure 2:
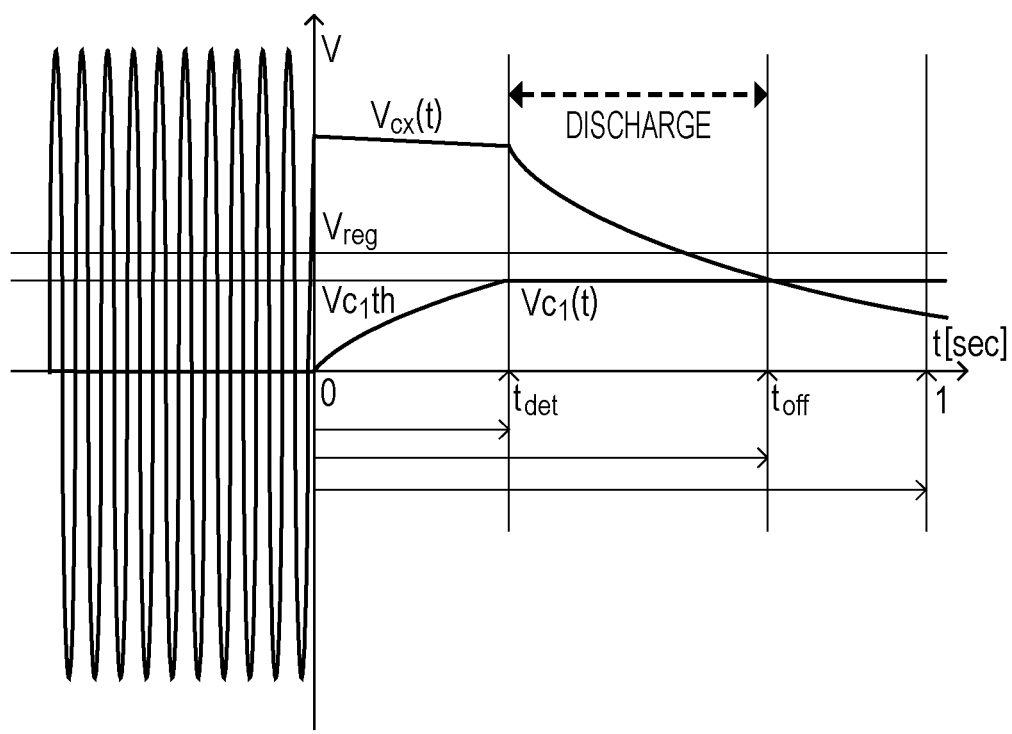
FIG. 2 illustrates operation waveforms of a discharging circuit of the first embodiment.

Next, with reference to FIG. 2, operations by a discharging circuit of the first embodiment will be described. FIG. 2 illustrates operation waveforms and timings of a discharging circuit of this embodiment. In FIG. 2, $V_{CX}(t)$ is the voltage across the X-capacitor 140, $V_{C1}(t)$ is the voltage across the capacitor 141, $V_{Cth}$ is an ON threshold value voltage of the two-way switch 170, and $V_{reg}$ is a predetermined voltage to which the voltage after removal of the AC plug is required to reduce within one second. $t=t_{det}$ is the time when the two-way switch 170 is turned on.

$$t_{det} \leq t \leq t_{off} \quad (5)$$

where $(t_{det}-t_{off})$ is (t a period the X-capacitor 140 is discharged because the two-way switch is turned on. As illustrated in FIG. 2, the resistance value $R_0$ of the discharge resistance 120 and the time $t_{det}$ until the two-way switch element 170 is turned on are set such that the voltage may be equal to or lower than the predetermined voltage $V_{reg}$ within one second after the two-way switch 170 is turned off. $V_{c1th}$ in FIG. 2 indicates the voltage of the X-capacitor 140 when the two-way switch 170 is turned off. In other words, a relationship $V_{C1th} < V_{reg}$ is satisfied. According to this embodiment, in order to acquire the predetermined voltage $V_{reg}$ that is equal to or lower than 60 V, the time $t_{det}$ until the two-way switch element 170 is turned on is 0.4 s, $C_X=1.0$ μF, $C_1=0.01$ μF, $R_0=330$ kΩ, $R_1=20$ MΩ (the same is true in the resistance value of the resistance 122), the AC voltage of the commercial AC power supply is equal to 230 $V_{ac}$, $V_{C1th}=40$ V, Vdc=300 V, and $V_{reg}=60$ V. These set values may be changed properly in accordance with the predetermined voltage.

As described above, the residual electric charges of an X-capacitor may be emitted quickly after the AC plug is removed. Further, the power consumption may be reduced (an effect of decreasing of about 50.3 mW may be acquired) more than discharging circuits in the past, as described above.

According to this embodiment, an RC integrating circuit including a resistance and a capacitor detects the removal of an AC plug. In other words, because the RC integrating circuit functions as a filter, the tolerance against disturbance interference may be higher than the detection by a zero-crossing detecting circuit as in Japanese Patent Laid-Open No. 2005-201587.

Figure 3:
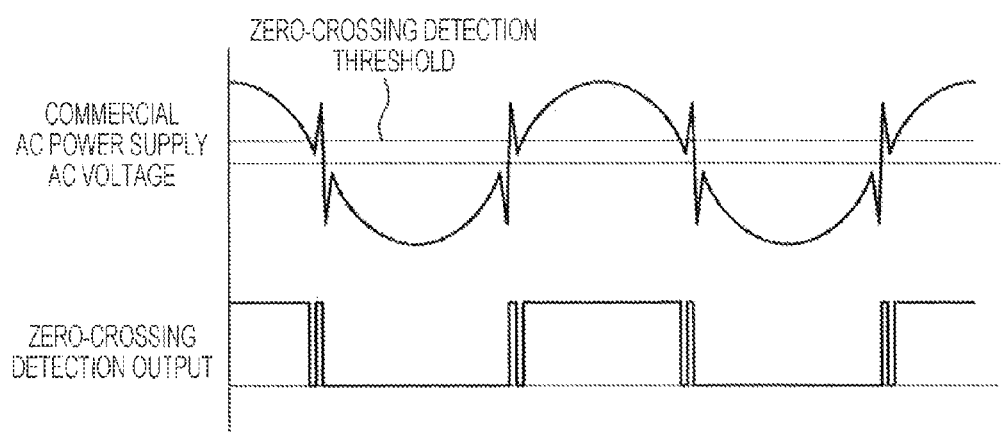
FIG. 3 illustrates detection output waveforms when a zero-crossing detecting circuit in the past is used.

FIG. 3 illustrates a state where noise is superposed on the AC voltage of a commercial AC power supply and a detection output by a zero-crossing detecting circuit in the past. Particularly, when noise is superposed in the vicinity of a threshold value for zero-crossing detection, the outputs may vary at the falling edges and leading edges of a signal of the detection output as illustrated in FIG. 3, possibly causing mis-detection of removal of the AC plug and/or a delay in detection of removal of the AC plug.

Figure 4:
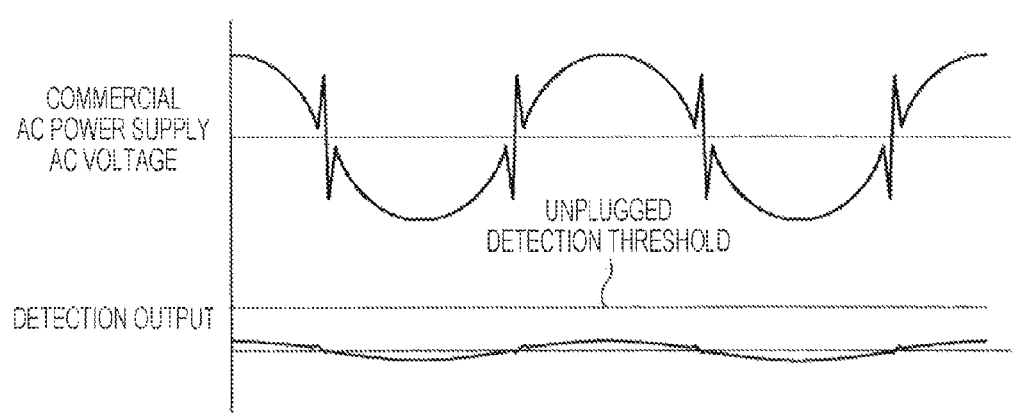
FIG. 4 illustrates detection output waveforms when a zero-crossing detecting circuit of the first embodiment is used.

FIG. 4 illustrates a state where noise is superposed on the AC voltage of a commercial AC power supply and a detection output for detecting removal of an AC plug in the configuration of this embodiment. The detection output may be the voltage $V_{C1}(t)$ across the capacitor 141 in FIG. 1, for example. According to this embodiment, the RC integrating circuit functions as a filter. Thus, even when noise is superposed on AC voltage as illustrated in FIG. 4, the possibility for mis-detecting removal of the AC plug may decrease. In other words, according to this embodiment, removal of an AC plug may be detected correctly and quickly even when noise is superposed on the AC voltage of a commercial AC power supply.

Next, a second embodiment will be described.

Figure 5A:
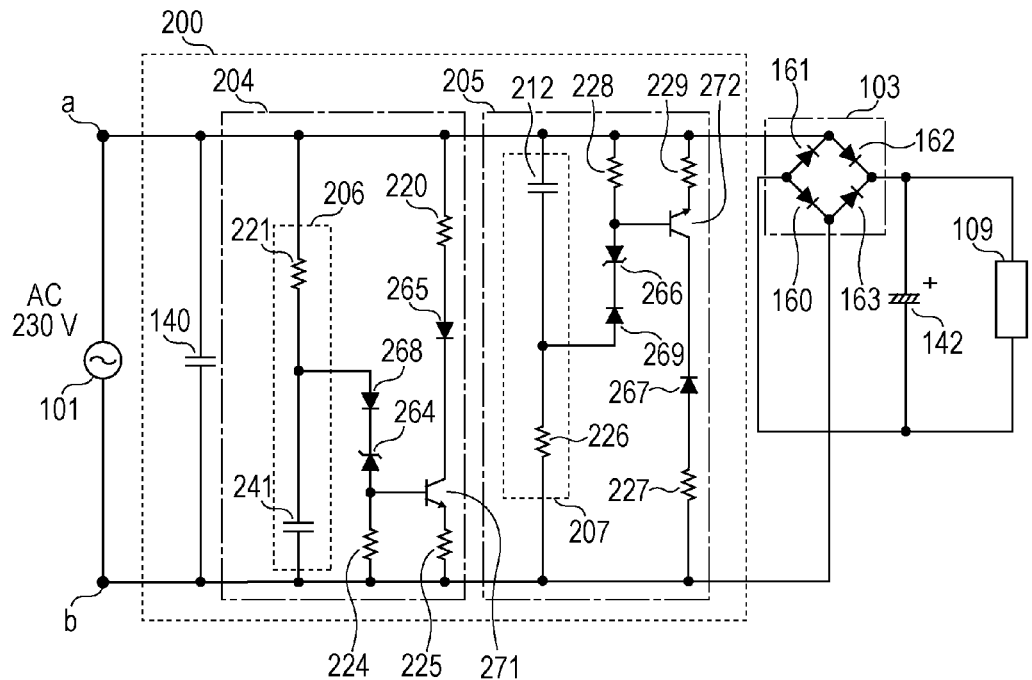
FIGS. 5A and 5B illustrate a discharging circuit of a second embodiment.
Figure 5B:
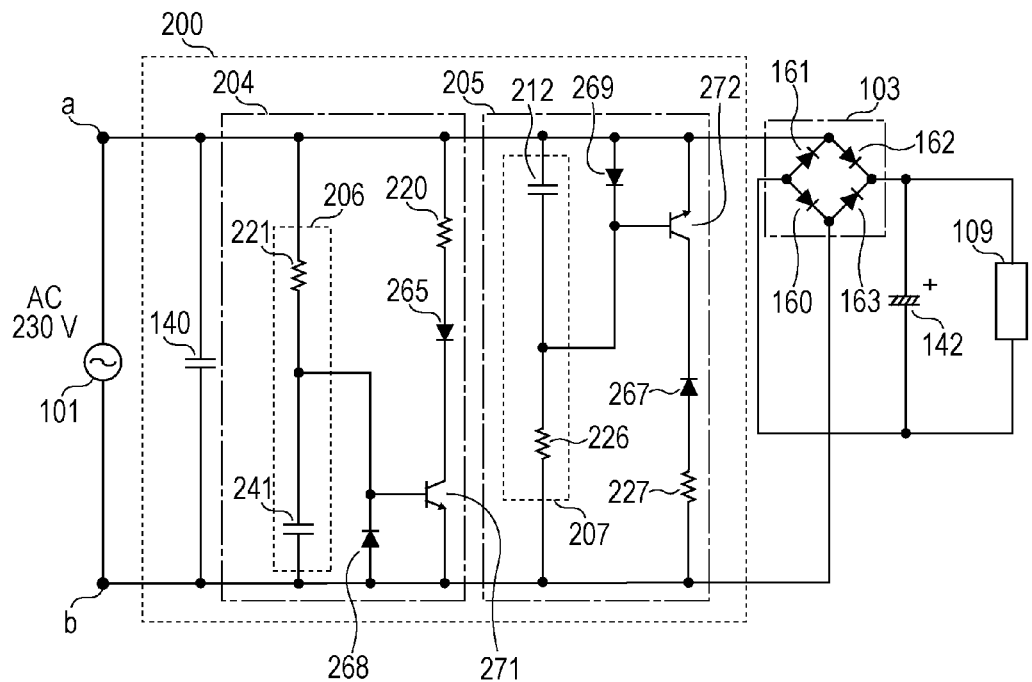

FIGS. 5A and 5B illustrate a discharging circuit of a second embodiment. The circuit of the second embodiment has the same fundamental configuration as that of the discharging circuit in FIG. 1 according to the first embodiment except that the two-way switch element 170 in FIG. 1 is replaced by a switch element which feeds current in one direction. In this circuit configuration, the polarity for discharging residual electric charges depends on the phase of the AC voltage of the commercial AC power supply at the instance of the removal of the AC plug. For that, a second discharging circuit 205 having a dual relationship with the first discharging circuit 204 is connected between AC lines.

In FIG. 5A, the discharging circuit 200 has an X capacitor 140, a first discharging circuit 204, and a second discharging circuit 205. Both ends of an AC plug (commercial AC power supply 101) are connected to a contact a and a contact b. The first discharging circuit 204 has a discharge resistance 220, a first filter circuit 206 having a capacitor 241 and a resistance 221, a switch element (hereinafter, called a one-way switch element) 271 which feeds current in one direction, resistances 224 and 225, a zener diode 264, and a diode 265. The second discharging circuit 205 has a discharge resistance 227, a second filter 207 having a capacitor 243 and a resistance 226, a one-way switch element 272 which is an element that feeds current in the opposite direction of that of the one-way switch element 271 in the first discharging circuit 204, resistances 228 and 229, a zener diode 266, and a diode 267. In FIGS. 5A and 5B, according to this embodiment, the one-way switch elements 271 and 272 are a first transistor and a second transistor which are NPN type transistors. However, the NPN type transistors may be replaced by PNP type transistors.

The zener diode 264 adjusts a threshold voltage for turning on the one-way switch element 271. The zener diode 264 may be eliminated when the adjustment of the threshold voltage for turning on the one-way switch element 271 is not necessary. Similarly, the zener diode 266 is provided for adjusting a threshold voltage for turning on the one-way switch element 272. The zener diode 266 may be eliminated when the adjustment of the threshold voltage for turning on the one-way switch element 272 is not necessary. The diode 265 is provided to prevent the current flow from an emitter to a collector of the one-way switch element 271. The diode 267 takes the same role as the diode 265 and is an element that prevents the current flow from an emitter to a collector of the one-way switch element 272.

The diode 268 is provided to prevent the destruction of the element 271 by overvoltage between a base and the emitter of the one-way switch element 271 when the contact b has a positive potential. In the same manner, the diode 269 is provided to prevent the destruction of the one-way switch element 272 when the contact a has a positive potential. Each of the diodes 268 and 269 may be configured by connecting a base of the one-way switch element and a cathode of the diode and an emitter of the one-way switch and an anode of the diode, for example.

According to this embodiment, like the configuration of the first embodiment, setting the time constant of the discharge resistance 221 and capacitor 241 in the filter circuit 206 that is the first filter unit sufficiently longer than the cycle of the AC voltage of the commercial AC power supply may sufficiently lower the voltage across the capacitor 141 than the AC voltage. The peak of voltage across the capacitor 241 that is lower than the threshold voltage $V_{C1th}$ for turning on the one-way switch element 270 may prevent the conduction of the one-way switch element 270. The same is true in the filter circuit 207 that is the second filter unit, setting the time constant sufficiently longer than the cycle of the power supply voltage of the commercial AC power supply may prevent conduction of the one-way switch element 272. Setting the resistance value of the discharge resistance 221 and 226 sufficiently higher may reduce the power consumption by the discharge resistance (discharging circuit) more than before.

As operations by the discharging circuit in FIG. 5A of this embodiment, operations by the first discharging circuit 204 will be described in a case where tan ACV plug is removed when the AC voltage of the contact a has a positive phase. Because the operations by the second discharging circuit 205 are the same as those of the first discharging circuit 204, the description will be omitted.

Upon removal of the AC plug, the voltage across the male fittings may be required to drop it to a predetermined voltage or lower within one second. At the instance of removal of the AC plug, the X-capacitor 140 stores charges, and the voltage across the X-capacitor 140 attenuates is roughly attenuated in the time constant of the capacitance of the capacitor 141 and a synthesized resistance value of the discharge resistance 221 and the discharge resistance 226. As described above, because the resistance value of the resistance 221 is set higher, the voltage across the X-capacitor 140 is substantially direct current.

On the other hand, the voltage across the capacitor 241 increases exponentially with the passage of time. When the voltage exceeds the threshold value with which the one-way switch element 271 is turned on, the discharge resistance 220 and the resistance 225 are brought into conduction. Thus, the residual electric charges of the X-capacitor 140 are discharged. It may be required that the one-way switch element 271 is turned on and the time for discharging the residual electric charges of (or voltage across) the capacitor 140 to the a predetermined voltage $V_{reg}$ by the discharge resistance 220 and resistance 225 is kept within one second. The same scheme as the first embodiment may be applied for keeping the time for discharging the residual electric charges of the X-capacitor 140 to the predetermined voltage $V_{reg}$ within one second.

Figure 6:
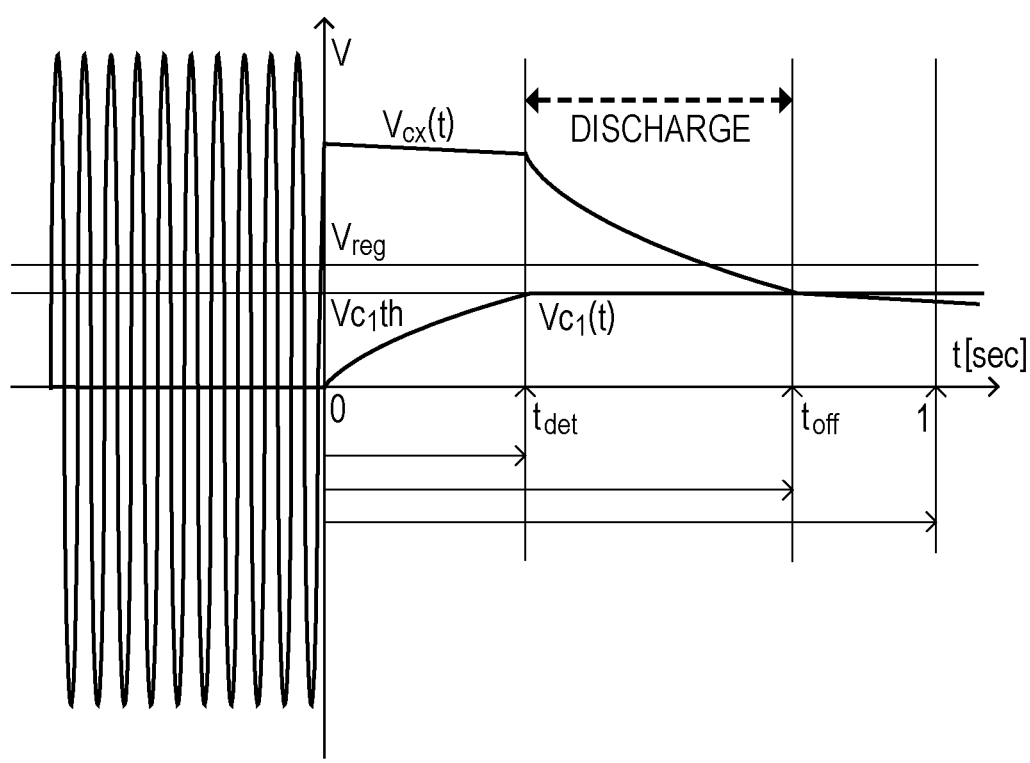
FIG. 6 illustrates operation waveforms of a discharging circuit of the second embodiment.

FIG. 6 illustrates operation waveforms and timings of the discharging circuit of this embodiment. According to this embodiment, differences described with reference to FIG. 2 from the first embodiment will be described. In FIG. 6, $V_{CX}(t)$ is the voltage across the X-capacitor 140, $V_{C1}(t)$ is the voltage across the capacitor 241, $V_{Cth}$ is the threshold voltage for turning on the one-way switch element 271, and $V_{reg}$ is the voltage to be reduced within one second. When $V_{CX}(t)$ is lower than the voltage $V_{C1th}$ at the timing when the one-way switch element 271 is turned off, the voltage across the X-capacitor 140 is substantially direct current again, and discharging the residual electric charges of the X-capacitor 140 delays. Thus, $V_{C1th}$ is desirably set lower than $V_{reg}$.

According to the second embodiment, when the AC plug is removed, the residual electric charges in an X-capacitor may be emitted quickly. The power consumption may be reduced more than discharging circuits in the past, like the first embodiment.

Also according to this embodiment, an RC integrating circuit having a resistance and a capacitor detects removal of the AC plug, like the first embodiment. In other words, because the RC integrating circuit functions as a filter, the tolerance against disturbance interferences may be stronger than cases where a zero-crossing detecting circuit detects it as in Japanese Patent Laid-Open No. 2005-201587.

FIG. 5B illustrates a variation example of the circuit described with reference to FIG. 5A. The circuit has a smaller circuit part than that of the configuration in FIG. 5A to implement simplified and inexpensive circuit configuration. It is different from the configuration in FIG. 5A in that the connected positions of the diodes 268 and 269 are changed and the zener diodes 264 and 266 and resistances 225 and 229 are eliminated. Even with the circuit configuration, the same operations as those by the configuration in FIG. 5A may be implemented.

Next, a third embodiment will be described.

Figure 7:
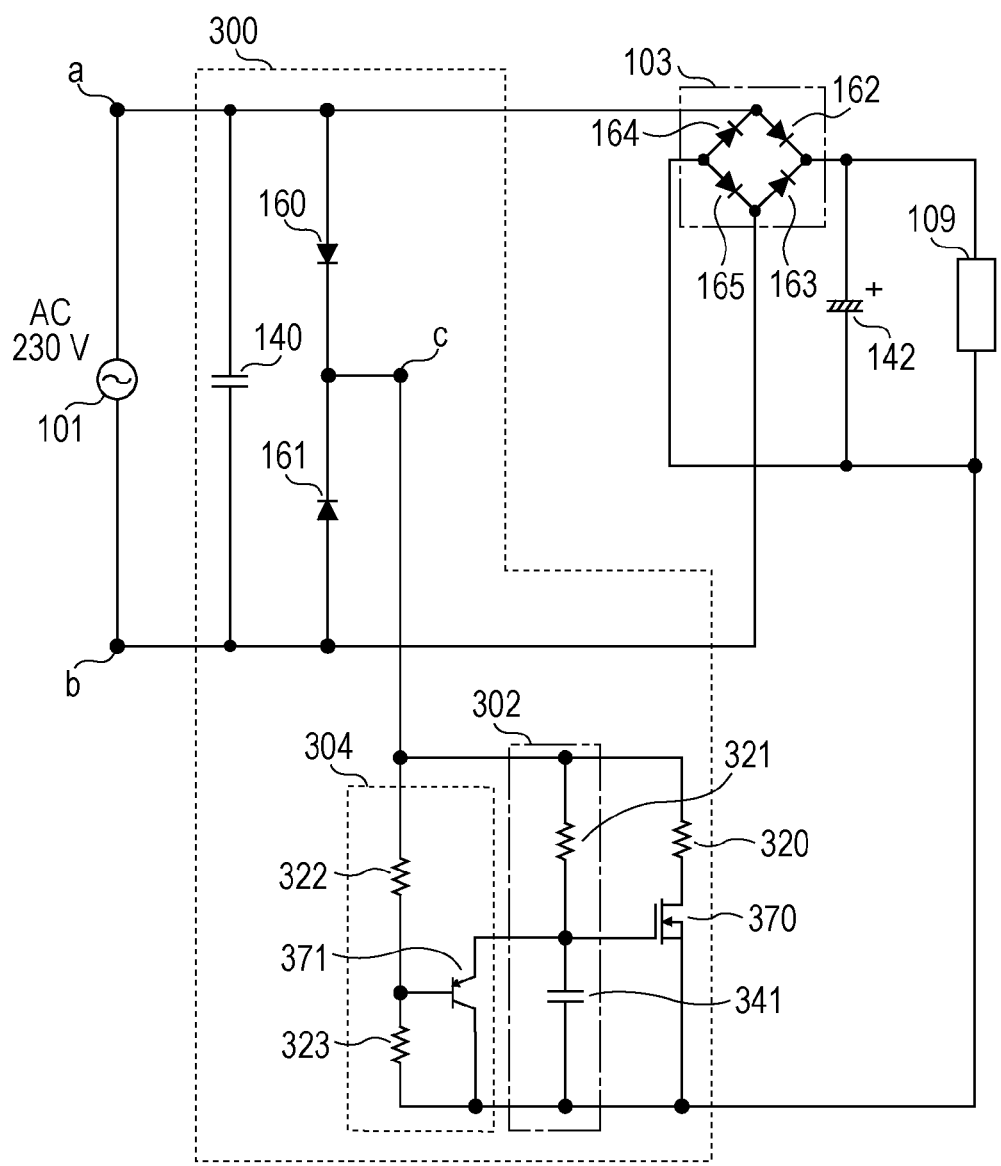
FIG. 7 illustrate a discharging circuit of a third embodiment.
Figure 8:
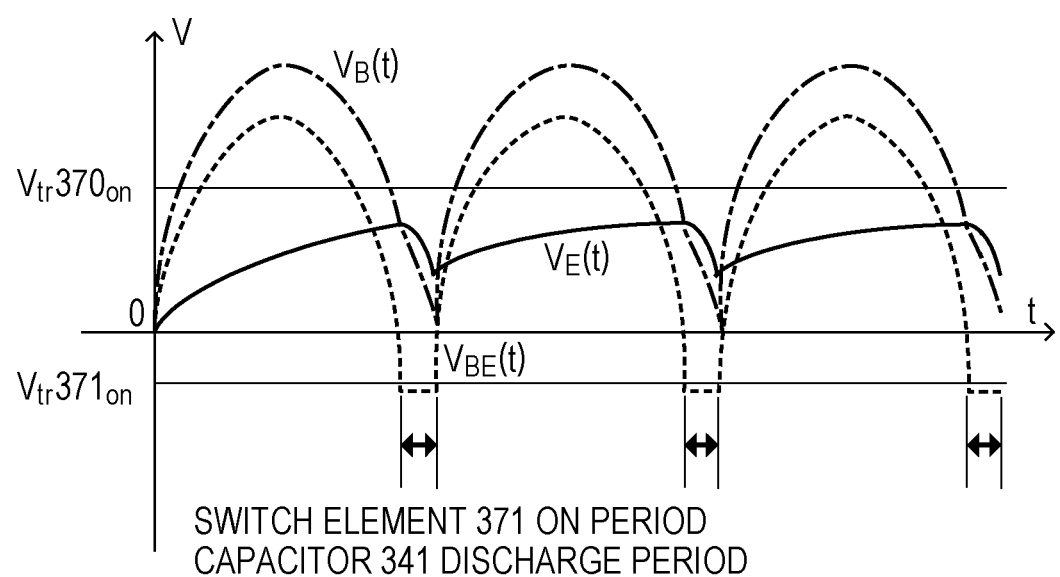
FIG. 8 illustrates operation waveforms of a discharging circuit of the third embodiment.

FIG. 7 illustrates a configuration of a discharging circuit according to a third embodiment. The configuration of the third embodiment is different from the configuration of the first embodiment in that rectifiers 160 and 161 are connected between AC lines, and a circuit configuration for discharging is provided between the rectifiers 160 and 161. A discharging circuit 300 of the third embodiment includes an X-capacitor 140, the rectifiers 160 and 161, a discharge resistance 320, a filter circuit 302 having a capacitor 341 and a resistance 321, a circuit 304 having resistances 322 and 323 and a switch element 371 for discharging the capacitor 341, and a switch element 370 which brings the discharge resistance 320 into conduction. A contact a and a contact b are connected to an AC plug.

It will be described below that power consumption may be reduced by a discharging circuit according to this embodiment. According to this embodiment, when AC voltage of a commercial AC power supply is input, the circuit including the discharge resistance 320 is prevented from operating to implement operations by a highly resistant circuit and thus reduce the power consumption.

Referring to FIG. 7, voltage as a result of rectification of AC voltage is applied to the filter circuit 304. Without the filter circuit 304, the voltage across the capacitor 341 increases with the passage of time, and the switch element 370 is turned on at some timing. When the switch element 370 is turned on, the circuit including the discharge resistance 320 operates and consumes power. According to this embodiment, the filter circuit 304 is provided to discharge the charges stored in the capacitor 341 and thus keeps the voltage across the capacitor 141 equal to or lower than the threshold voltage for turning on the switch element 370.

Figure 9:
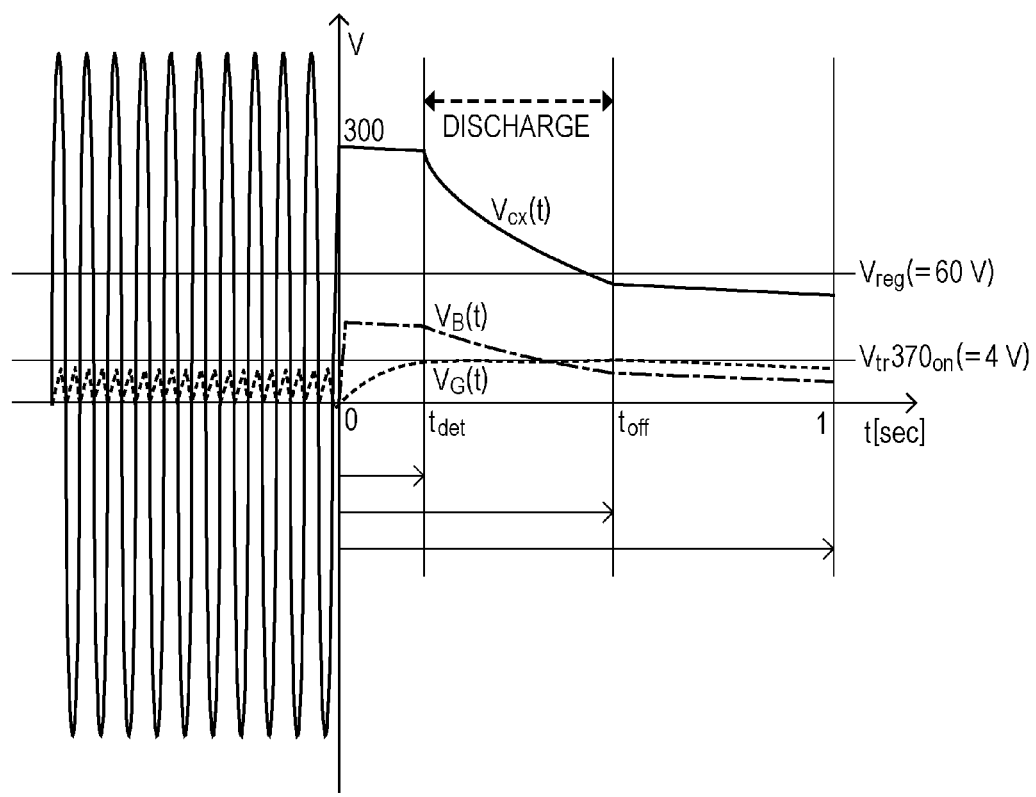
FIG. 9 illustrates operation waveforms of a discharging circuit of the third embodiment.

FIG. 9 illustrates operation waveforms of the discharging circuit of this embodiment. In FIG. 9, $V_B(t)$ is a base potential of the switch element 371, $V_E(t)$ is an emitter potential, and $V_{BE}(t)$ is a base-emitter potential. $V_{tr171on}$ is a threshold voltage for turning on the switch element 371, and $V_{tr171on}$ is a threshold voltage for turning on the switch element 370. The switch element 371 is turned on when $V_{BE}(t)$ exceeds the threshold voltage $V_{tr371on}$, and $V_E(t)$ decreases when the charges in the capacitor 341 are discharged. Because $V_E(t)$ is equal to the gate voltage of the switch element 370, a relationship $V_E(t)=V_G(t)$ is satisfied. The constant of the discharging circuit is set to prevent $V_G(t)$ from exceeding the threshold voltage $V_{tr370on}$ when AC voltage of the commercial AC power supply is supplied. Thus, when AC voltage is supplied, power is consumed by the resistance 321 and the resistance 322 and resistance 323 without bringing the discharge resistance 320 into conduction.

In this case, setting the resistance values of the resistances 321, 322, and 323 sufficiently higher may reduce the power consumption by discharge resistance than before. For example, if the capacitance of the X-capacitor 40 in a discharging circuit in the past is equal to 1.0 µF, the required discharge resistance 20 may be 1 MΩ. The power consumption by the discharge resistance 20 is equal to about 52.9 mW when the AC voltage of the commercial AC power supply is AC 230 V. According to this embodiment, if the capacitance of the X-capacitor 140 is 1.0 µF, the resistance 321 is 30 MΩ, the resistance 322 is 20 MΩ, the resistance 323 is 1.3 MΩ and the AC voltage is AC 230 V, the total power consumption by the resistances 321, 322, and 323 is equal to about 4.25 mW. The effect of decreasing of power consumption according to this embodiment may be calculated as about 48.65 mW (about 52.09 mW–about 4.25 mW).

On the other hand, when the AC plug is removed, it may be required to cause the voltage across the male fitting of the AC plug to a predetermined voltage or lower within one second. At the instance of the removal of the AC plug, the X-capacitor 140 stores charges, and the voltage across the X-capacitor 140 is roughly attenuated in the time constant defined by the capacitances of the X-capacitor 140 and capacitor 341 and the resistance values of the resistance 322 and resistance 323. However, as described above, because the resistance 321, resistance 322 and resistance 323 are set to hive higher resistance values, the voltage across the X-capacitor 140 is not attenuated very much.

On the other hand, the voltage across the capacitor 341 increases exponentially with the passage of time. When the voltage exceeds the threshold value with which the switch element 370 is turned on, the discharge resistance 320 is brought into conduction. The residual electric charges of the X-capacitor 140 may thus be quickly discharged. According to this embodiment, it may be required that the switch element 370 is to be turned on, the predetermined voltage for the residual electric charges of the X-capacitor 140 through the discharge resistance 320 is to be $V_{reg}$ (60 V is set according to this embodiment), and the time for discharging to the voltage is to be within one second. The method for discharging residual electric charges within one second according to this embodiment will be described in detail below.

Here, $V_G(t)$ is a gate potential of the switch element 370 after removal of the AC plug as a function of a time t, $C_1$ is a capacitance of the capacitor 141, $R_1$ is a resistance value of the resistance 321, and $V_{dc}$ is a voltage across the X-capacitor 140 at the instance (t=0) of the removal of the AC plug. In this case, the gate potential of the switch element 170 with a function of the time t, $V_G(t)$ may be acquired by Expression (4).

$$V_G(t) = V_{dc}\left(1 - e^{\frac{t}{R\cdot 1 \cdot C_1}}\right) \quad (4)$$

When the time t until the switch element 370 is turned on is equal to $t_{det}$, it may be acquired by Expression (5).

$$t_{det} = R_1 \cdot C_1 \cdot \log_e\left(\frac{V_{dc}}{V_{dc} - V_{tr370on}}\right) \quad (5)$$

where the gate-source voltage of the switch element 170, $V_G(t_{det})=V_{tr370on}$. From Expression (5), $t_{det}$ depends on $R_1$, $C_1$, and/or $V_{tr370on}$.

The voltage across the X-capacitor 140, that is the voltage between the AC lines, after the switch element 170 is turned on may be acquired by Expression (6).

$$V_{CX}(t) = V_{dc} \cdot e^{-\frac{t-t_{det}}{R_0 \cdot C_X}} \quad (6)$$

where, as a function of time $V_{CX}(t)$, $C_X$ is a capacitance of the X-capacitor 140, and $R_0$ is a resistance value of the discharge resistance 320. In this case, Expression 6 is satisfied during a period from $t=t_{det}$ to the time when the switch element 370 is turned off again.

Because it may be required that $V_{CX}(t)$ is equal to or lower than the predetermined voltage $V_{reg}$ (60 V) within one second after removal of the AC plug, the resistance value $R_0$ of the discharge resistance 320, the resistance value $R_1$ of the resistance 321, the capacitance $C_1$ of the capacitor 341, and the ON threshold voltage $V_{tr370on}$ of the switch element 370 are set to satisfy:

$$V_{CX}(1) \leq V_{reg}$$

FIG. 9 illustrates operation waveforms and timings when the discharging circuit 300 of this embodiment operates. In FIG. 9, $V_{CX}(t)$ is a voltage across the X-capacitor 140, $V_G(t)$ is a gate potential of the switch element 370, $V_B(t)$ is a base potential of the switch element 371, $V_{tr370on}$ is a threshold voltage with which the switch element 370 is turned on, and $V_{reg}$ (60 V) is a predetermined voltage to which the voltage is required to reduce within one second. $t=t_{det}$ is the time when the switch element 370 is turned on.

$$t_{det} \leq t \leq t_{off}$$

($t_{det}-t_{off}$) is a period during which the switch element 370 has an ON state and the X-capacitor 140 is being discharged through the discharge resistance 320. As illustrated in FIG. 3, the constant is set such that the voltage may be reduced to $V_{reg}$ or lower within one second. Here, the resistance value of the resistance 122 is defined as $R_2$, and the resistance value of the resistance 323 is defined as $R_3$. According to this embodiment, $C_X=1.0$ μF, $C_1=0.1$ μF, $R_0=100$ kΩ, $R_1=30$ MΩ, $R_2=20$ MΩ, $R_3=1.3$ MΩ, the AC voltage of the commercial AC power supply is 230 Vac, $V_{tr170on}=4$ V, $V_{dc}=300$ V, $V_{reg}=60$ V. With these settings, the discharging circuit 300 operates as illustrated in FIG. 10, $V_{reg}$ (60 V) or lower may be acquired within one second after removal of the AC plug.

As described above, the residual electric charges of an X-capacitor may be emitted quickly after an AC plug is removed. Further, as described above, the power consumption may be reduced more than discharging circuits in the past (an effect of decreasing of about 48.65 mW may be acquired).

According to this embodiment, an RC integrating circuit having a resistance and a capacitor detects removal of the AC plug. In other words, because the RC integrating circuit functions as a filter, the tolerance against disturbance interferences may be stronger than cases where a zero-crossing detecting circuit detects it as in Japanese Patent Laid-Open No. 2005-201587.

Figure 10:
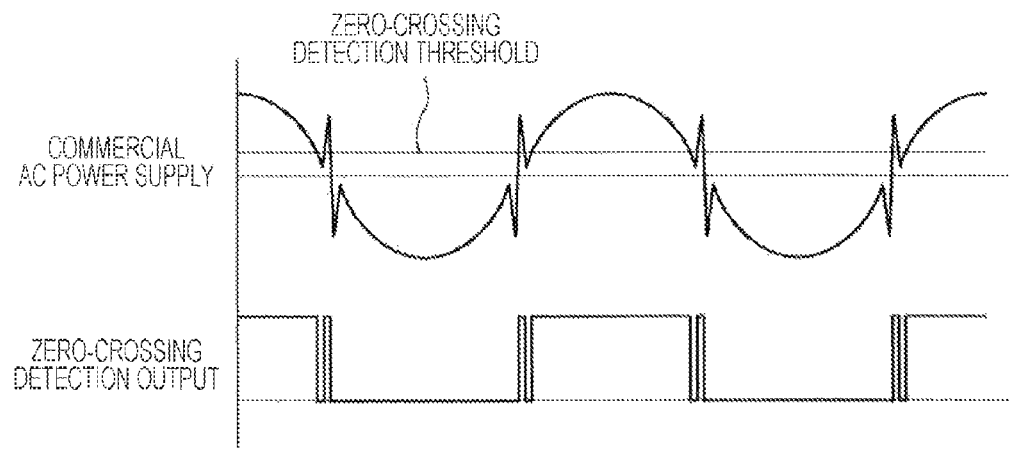
FIG. 10 illustrates detection output waveforms when a zero-crossing detecting circuit in the past is used.

FIG. 10 illustrates a state where noise is superposed on the AC voltage of a commercial AC power supply and a detection output by a zero-crossing detecting circuit in the past. Particularly, when noise is superposed in the vicinity of a threshold value for zero-crossing detection, the outputs may vary at the falling edges and leading edges of a signal of the detection output as illustrated in FIG. 10, possibly causing mis-detection of removal of the AC plug and/or a delay in detection of removal of the AC plug.

Figure 11:
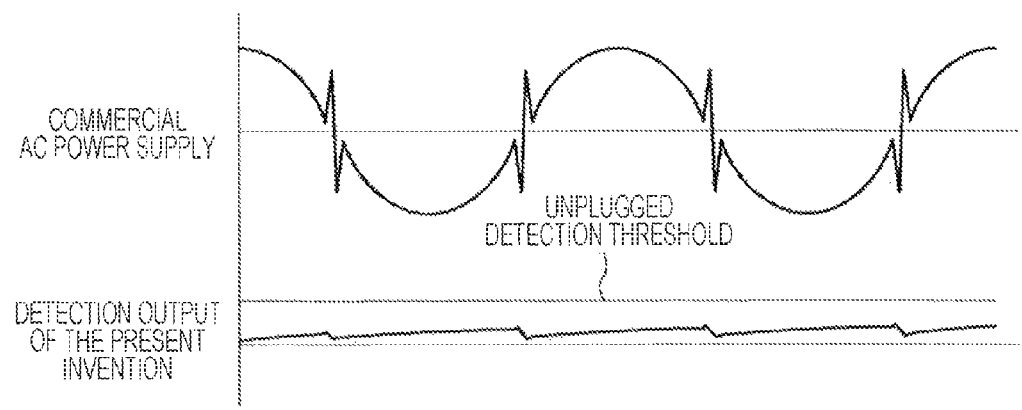
FIG. 11 illustrates detection output waveforms when a zero-crossing detecting circuit of the third embodiment is used.

FIG. 11 illustrates a state where noise is superposed on the AC voltage of a commercial AC power supply and a detection output for detecting removal of an AC plug in the configuration of this embodiment. The detection output may be the voltage $V_{C1}(t)$ across the capacitor 341 in FIG. 7, for example. According to this embodiment, the RC integrating circuit functions as a filter. Thus, even when noise is superpose on AC voltage as illustrated in FIG. 11, the possibility for mis-detecting removal of the AC plug may decrease. In other words, according to this embodiment, removal of an AC plug may be detected correctly and quickly even when noise is superposed on the AC voltage of a commercial AC power supply.

According to this embodiment, the switch element 371 is a field-effect transistor (also called an FET). However, the switch element 371 may be any switch element which allows current flow, such as an npn type transistor, a pnp type transistor, and a triac.

Figure 12:
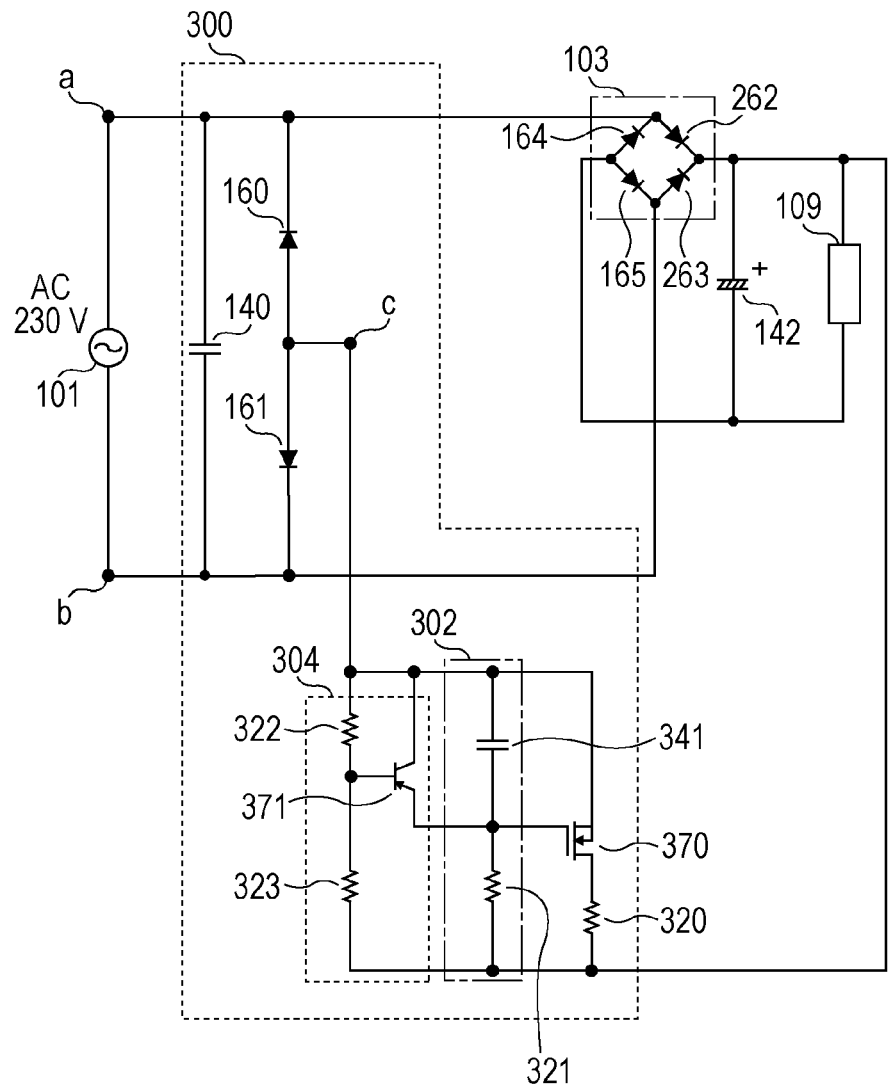
FIG. 12 illustrate a discharging circuit of a variation example of the third embodiment.
Figure 13:
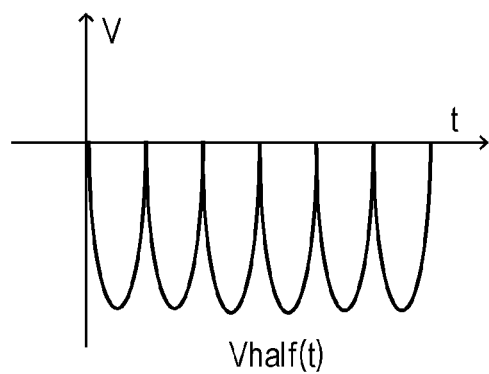
FIG. 13 illustrates a voltage waveform at a contact c in a discharging circuit of a variation example of the third embodiment.

According to this embodiment, the rectifiers 160 and 161 have their cathodes connected to each other. However, their anodes may be connected, and the cathodes of the rectifiers may be connected to AC lines. In this configuration, by forming the discharging circuit as illustrated in FIG. 12, the value of potential $V_{half}(t)$ between a contact c and a positive terminal of a converter is as illustrated in FIG. 13, which allows substantially equivalent operations to the operations as described above.

Next, a fourth embodiment will be described.

Figure 14:
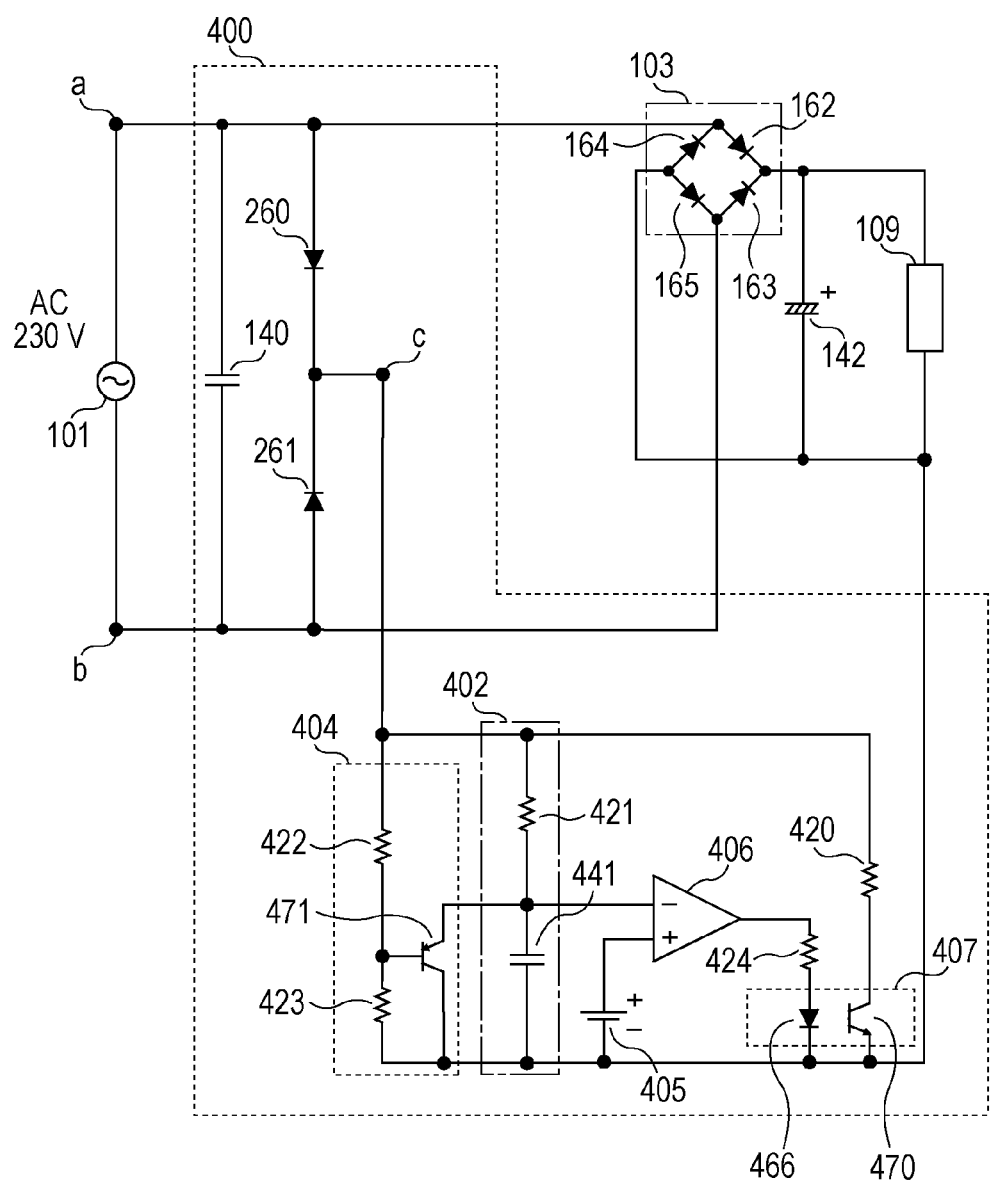
FIG. 14 illustrate a discharging circuit of a fourth embodiment.

FIG. 14 illustrates a discharging circuit according to a fourth embodiment. In the discharging circuit of the fourth embodiment, the output voltage of the filter circuit 402 is compared with a reference value (reference voltage) 405 by a comparator 406 which is a comparing unit, and the discharge resistance 420 is turned on through the photocoupler 407 for discharging if the output voltage is equal to or higher than the reference value (reference voltage) 405. A photocoupler 407 which is a transmitting unit for transmitting a signal includes a photodiode 466 and a phototransistor 470. A resistance 424 is for defining a forward current of the photodiode 426.

According to this embodiment, like the third embodiment, when AC voltage of a commercial AC power supply is input, the discharging circuit including the discharge resistance 420 is prevented from operating to implement operations by a highly resistant circuit and reduce the power consumption. In operation waveforms of the discharging circuit in FIG. 9 according to the third embodiment, the threshold voltage $V_{tr370on}$ for turning on the switch element 370 (FIG. 7) may be replaced by a reference voltage 405 of a positive terminal of the comparator 406 to achieve equivalent operations (operations by the discharging circuit in FIG. 14) according to the third embodiment. In other words, according to this embodiment, like the third embodiment, the residual electric charges of an X-capacitor may be emitted quickly after the AC plug is removed. Further, the power consumption may be reduced more than discharging circuits in the past, as described above.

According to this embodiment, an RC integrating circuit including a resistance and a capacitor detects the removal of an AC plug. In other words, because the RC integrating circuit functions as a filter, the tolerance against disturbance interference may be higher than the detection by a zero-crossing detecting circuit as in Japanese Patent Laid-Open No. 2005-201587.

According to the third embodiment, there is a possibility that the variations of the threshold voltage for turning on the switch element 370 may affect an operation by the discharging circuit. On the other hand, according to the fourth embodiment, the discharging circuit is controlled with the reference voltage 405. This may reduce the variations of the operation points caused by the variations of the threshold voltage for turning on the switch element 470.

Next, a fifth embodiment will be described.

Figure 15:
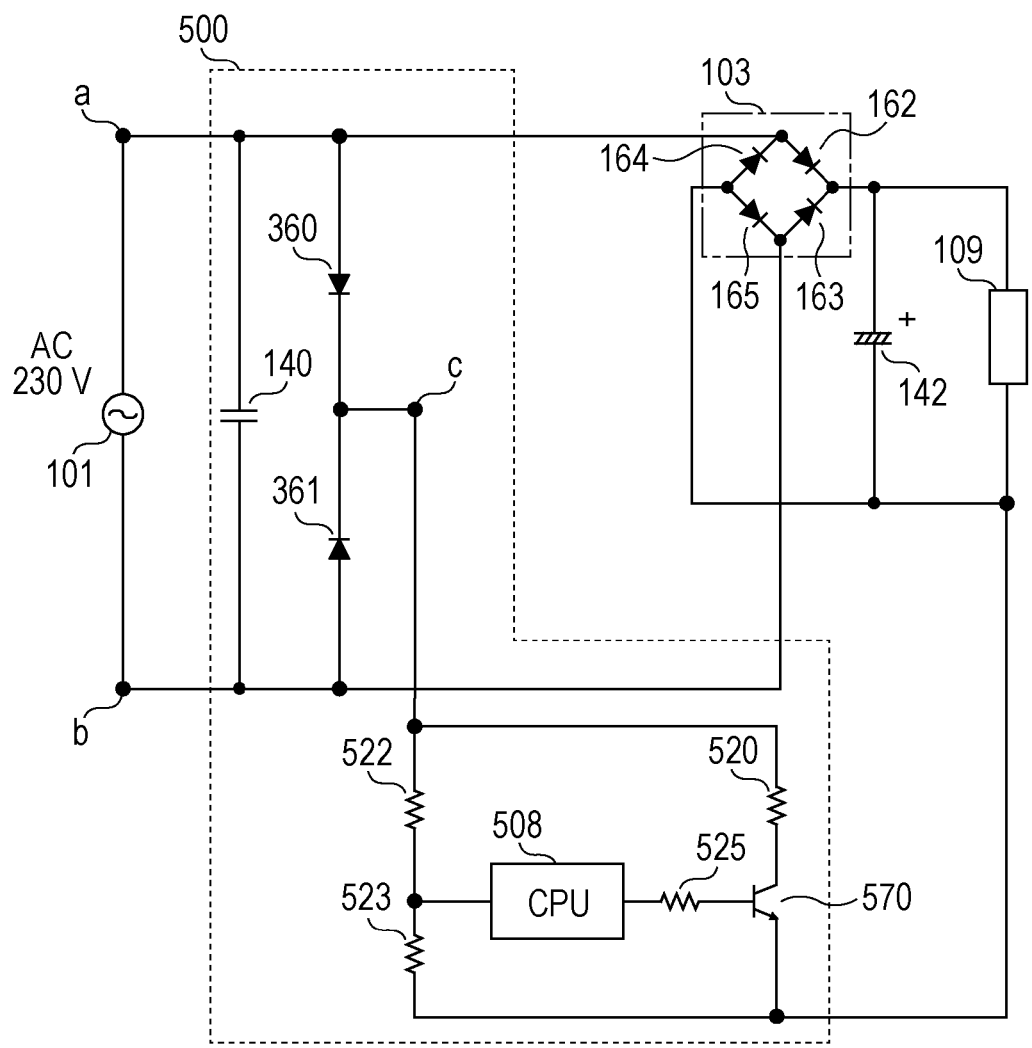
FIG. 15 illustrate a discharging circuit of a fifth embodiment.

FIG. 15 illustrates a discharging circuit according to a fifth embodiment. Like the third embodiment, when AC voltage of a commercial AC power supply is fed, the discharging circuit including the discharge resistance 520 is prevented from operating to implement operations by a highly resistant circuit and reduce the power consumption.

Referring to FIG. 15, a full-wave rectification waveforms of a commercial voltage is applied to a negative terminal of a smoothing capacitor 142 and across the contact c. The full-wave rectification waveform is divided by resistances 522 and 523, and the divided voltages are input to a CPU 508. For example, when the amount of change in voltage for a predetermined period of time is less (in a state where the AC voltage is not input), the CPU 508 detects that it is not a full-wave rectification voltage and determines that the AC plug has been removed. In this case, the switch element 570 may be turned on under the control of the CPU 508. The resistance 525 defines the base current of the switch element 570. When the switch element 570 is turned on, the charges remaining in the X capacitor 540 are discharged by the discharge resistance 520. In order to control the switch element 570, the CPU 508 is applied according to this embodiment, any device such as an ASIC may be used instead of a CPU if it may control an operation by a switch element.

As described above, also according to this embodiment, like the third embodiment, the residual electric charges of an X-capacitor may be emitted quickly after the AC plug is removed. Further, the power consumption may be reduced more than discharging circuits in the past, as described above.

Next, a sixth embodiment will be described.

Figure 16:
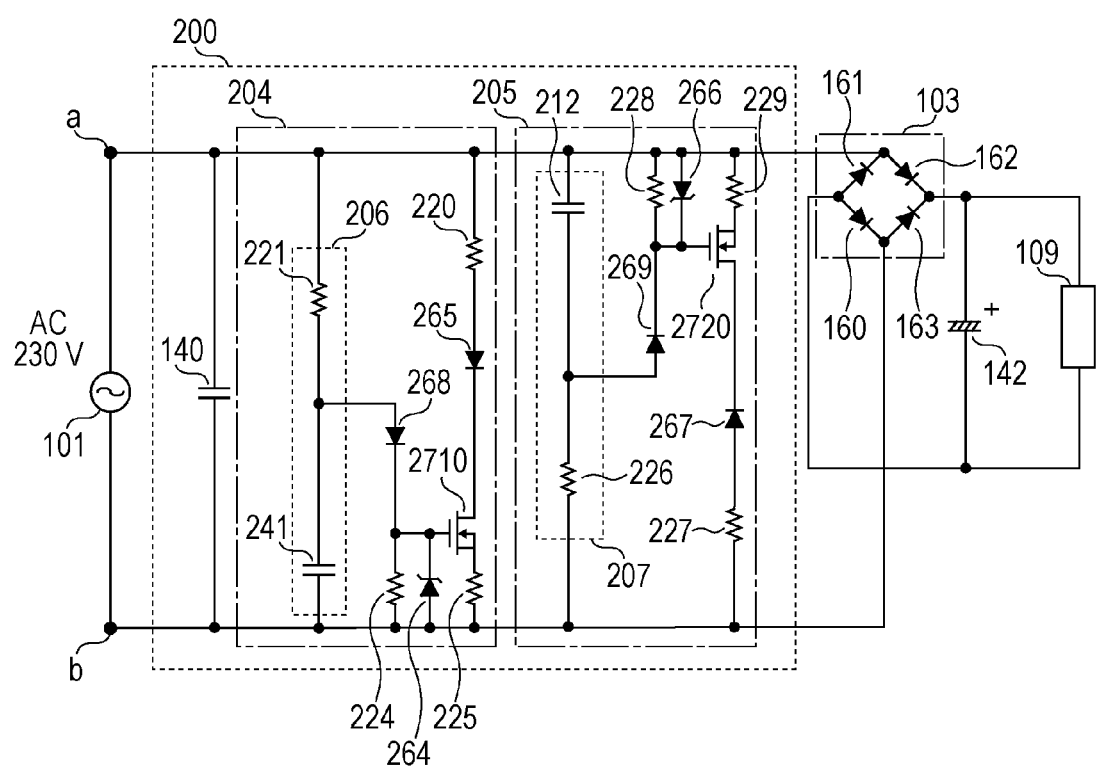
FIG. 16 illustrate a discharging circuit of a sixth embodiment.
Figure 17A:
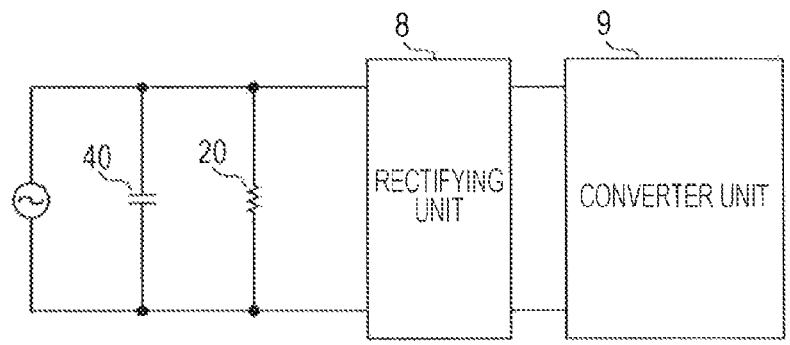
FIGS. 17A and 17B illustrate a discharging circuit in the past.
Figure 17B:
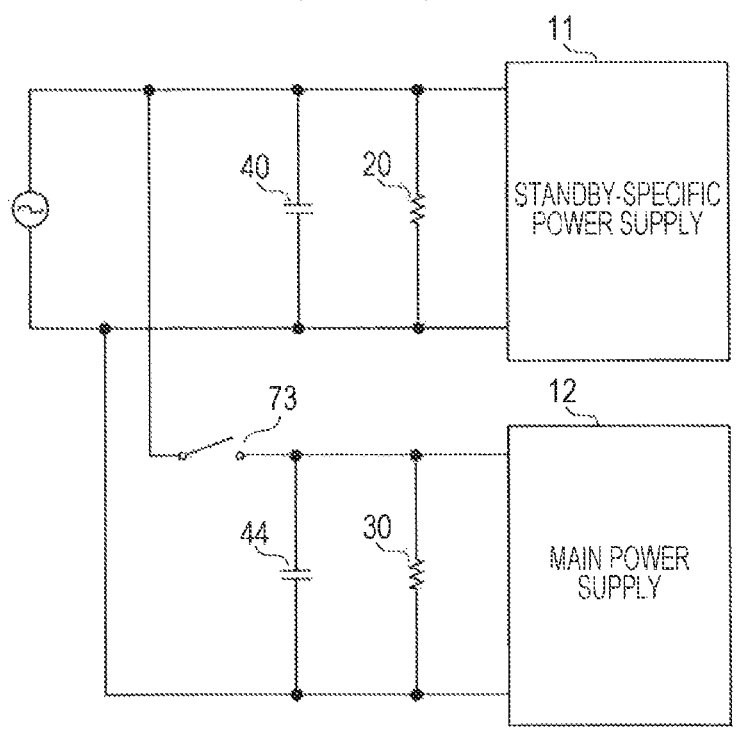

FIG. 16 illustrates a discharging circuit according to a sixth embodiment. This embodiment is a variation example of the discharging circuit according to the second embodiment (FIG. 5A). The circuit is implemented by replacing the switch element (transistor) in FIG. 5A by an N channel MOSFET (field-effect transistor).

An MOSFET 2710 in FIG. 16 starts operating when the gate voltage is in the order of 2 to 3 V. A zener diode 264 is a breakdown voltage element for protecting a gate of the MOSFET 2710 from excessive increase of a maximum gate voltage of the MOSFET 2710. According to this embodiment, an element of about 20 V is applied against breakdown voltage of a gate of the MOSFET, and the zener diode 264 is an element of 15 to 20 V in accordance with the breakdown voltage. A zener diode 266 is provided for the other MOSFET 2720 in FIG. 6 for the same purpose. Because the operation is the same as the operation by the MOSFET 2710, the description will be omitted. Because the operations by the circuit of this embodiment are the same as the operations by the second embodiment except for the circuit configuration around the switch element, the description of the operations will be omitted. When the switch element is configured by a MOSFET, like this embodiment, the resistance value of the resistance 221 may be set higher than the case employing a transistor as in FIG. 5. In other words, according to this embodiment, the power consumption by a discharge resistance (discharging circuit) may be reduced.

[Application Examples of Power Supply Having Discharging Circuit of the Present Invention]

A low voltage power supply is an example of the power supply according to any one of the aforementioned embodiment and supplies power to a motor functioning as a driving unit for an apparatus or a controller (including a CPU and a memory) which is a control unit. Such a low voltage power supply may be applied as a low voltage power supply for an image forming apparatus which forms an image on a recording material, for example. An example will be described below in which the power supply is applied as a low voltage power supply for an image forming apparatus.

Figure 18A:
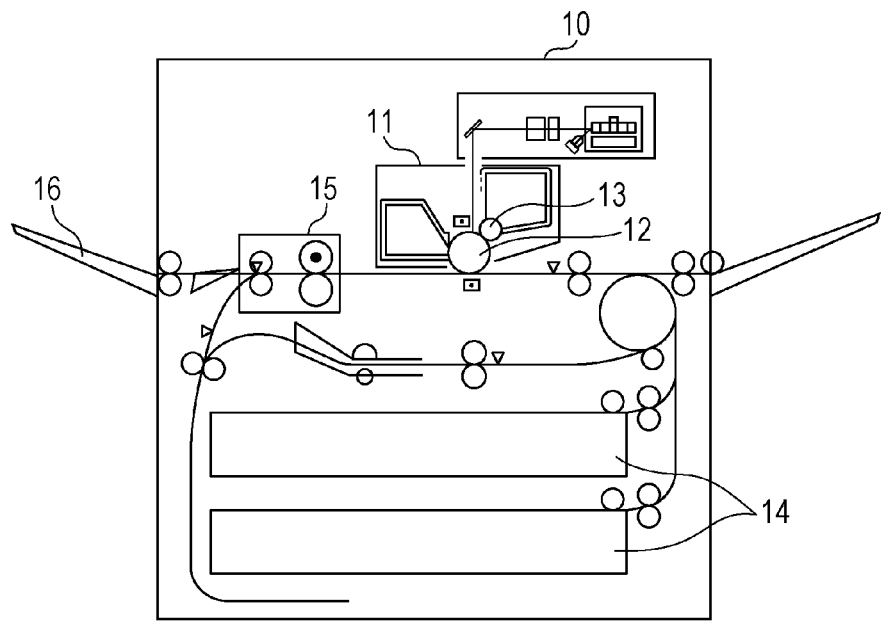
FIGS. 18A and 18B illustrate an application example of a power supply of any of the embodiments.
Figure 18B:
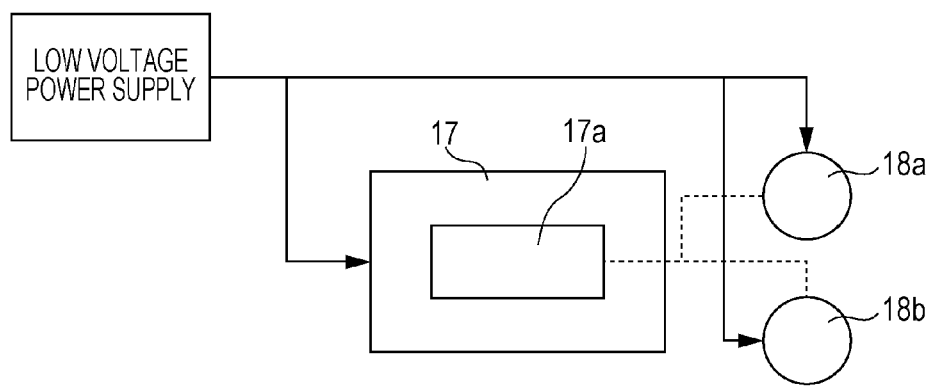

FIG. 18A illustrates a schematic configuration of a laser beam printer that is an example of an image forming apparatus. A laser beam printer 10 includes a photoconductor drum 12 which is an image carrier on which a latent image is formed by the image forming unit 11 and a developing unit 13 which develops a latent image formed on the photoconductor drum with toner. The toner image developed on the photoconductor drum 12 is transferred to a sheet (not illustrated) that is a recording medium fed from a cassette 14, and the toner image transferred to a sheet is fused by a fuser 15 and is ejected to a tray 16. FIG. 18B illustrates a controller that is a control unit of an image forming apparatus and a power supply line from a power supply to a motor which is a driving unit. The low voltage power supply is applicable as a power supply to a controller 17 having a CPU 17a which controls an image forming operation or as a low voltage power supply which supplies power to a motor 18a and motor 18b functioning as a driving unit for an image formation. The power to be supplied may be 3.3 V to the controller 17 and 24 V to the motor. For example, the motor 18a may be a motor which drives a conveying roller which transfers a sheet, and the motor 18b may be a motor which drives the fuser 15. Even when a low voltage power supply for an image forming apparatus is applied, the residual electric charges of an X-capacitor of a low voltage power supply may be emitted quickly after the AC plug is removed, like any of the aforementioned embodiments. Further, the power consumption may be reduced more than constant voltage power supplies in the past. The power supply according to any of the aforementioned variations is applicable as a power supply for an electronic apparatus, without limiting to image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-031038 filed Feb. 16, 2011, which is hereby incorporated by reference herein in its entirety.

What is claimed is:

1. A discharging circuit which discharges voltage of a first capacitance element connected between input lines for AC voltage to be input from a commercial AC power supply, the discharging circuit comprising:
   a first discharge element connected between the input lines and configured to discharge voltage of the first capacitance element;
   a switch connected to the first discharge element in series; and
   a second capacitance element connected to the switch,
   wherein the switch is turned on or off according to a voltage of the second capacitance element, and
   a second discharge element connected to the second capacitance element in parallel and configured to discharge voltage of the second capacitance element,
   wherein the voltage of the second capacitance element becomes larger than a predetermined value and the switch is turned on so as to discharge the voltage of the first capacitance element via the first discharge element in a case where the AC voltage is not input.

2. The discharging circuit according to claim 1, wherein the first discharging element is a first resistance element,
   the second discharging element is a second resistance element,
   the discharge circuit further includes a third resistance element connected to the second capacitance element in series, and
   the resistance value of the third resistance element larger than the resistance value of the first resistance element of the discharging unit.

3. The discharging circuit according to claim 1, wherein the switch is a bidirectional thyristor capable of feeding current bidirectionally.

4. The discharging circuit according to claim 1, further comprising:
   a plurality of switching units,
   wherein the plurality of switching units has a first transistor which feeds current in one direction and a second transistor which feeds current in the opposite direction from that of the first transistor.

5. A power supply which rectifies and smoothes AC voltage input from a commercial AC power supply and outputs voltage, the power supply comprising:
   a rectifying unit which rectifies the input AC voltage;
   a first capacitance element connected between the rectifying unit and an input portion for the AC voltage; and
   a discharging circuit provided between the first capacitance element and the rectifying unit, wherein
   the discharging circuit includes:
   a first discharge element connected between the input lines and configured to discharge voltage of the first capacitance element;
   a switch connected to the first discharge element in series; and
   a second capacitance element connected to the switch,
   wherein the switch is turned on or off according to a voltage of the second capacitance element, and
   a second discharge element connected to the second capacitance element in parallel and configured to discharge voltage of the second capacitance element,
   wherein the voltage of the second capacitance element becomes larger than a predetermined value and the switch is turned on so as to discharge the voltage of the first capacitance element via the first discharge element in a case where the AC voltage is not input.

6. An image forming apparatus having the power supply according to claim 5, comprising a control unit which controls an image forming operation, wherein voltage is supplied from the power supply to the control unit.

7. The discharging circuit according to claim 5, wherein the first discharging element is a first resistance element,
   the second discharging element is a second resistance element,
   the discharge circuit further includes a third resistance element connected to the second capacitance element in series, and
   the resistance value of the third resistance element is larger than the resistance value of the third resistance element of the discharging unit.

8. The discharging circuit according to claim 5, wherein the switch is a bidirectional thyristor capable of feeding current bidirectionally.

9. The discharging circuit according to claim 5, further comprising: a plurality of switching units,
   wherein the plurality of switching units has a first transistor which feeds current in one direction and a second transistor which feeds current in the opposite direction from that of the first transistor.

10. An image forming apparatus comprising:
    an image forming unit configured to form an image; and
    a power source configured to supply power to the image forming apparatus,
    wherein the power source is configured to output voltage of input AC voltage that is rectified and smoothed, and
    wherein the power source includes:
    a first capacitance element connected between the rectifying unit and an input portion for the AC voltage; and
    a discharging circuit provided between the first capacitance element and the rectifying unit, wherein
    the discharging circuit includes:
    a first discharge element connected between the input lines and configured to discharge voltage of the first capacitance element;
    a switch connected to the first discharge element in series; and
    a second capacitance element connected to the switch,
    wherein the switch is turned on or off according to a voltage of the second capacitance element, and
    a second discharge element connected to the second capacitance element in parallel and configured to discharged voltage of the second capacitance element,
    wherein the voltage of the second capacitance element becomes larger than a predetermined value and the switch is turned on so as to discharge the voltage of the first capacitance element via the first discharge element in a case where the AC voltage is not input.

11. The discharging circuit according to claim 1, wherein the switch is turned off in a case where the voltage of the second capacitance element is smaller than the predetermined value.

12. The power supply according to claim 5, wherein the switch is turned off in a case where the voltage of the second capacitance element is smaller than the predetermined value.

13. The image forming apparatus according to claim 10, wherein the switch is turned off in a case where the voltage of the second capacitance element is smaller than the predetermined value.

14. The image forming apparatus according to claim 10, further comprising:

a controller configured to control the image forming unit,
wherein the power source supplies power to the controller.

15. The image forming apparatus according to claim 10, further comprising:
a motor configured to drive the image forming unit,
wherein the power source supplies power to the motor.

16. A discharge circuit comprising:
a first capacitance element connected between input lines for AC voltage to be input from a commercial AC power supply;
a first discharge element connected between the input lines and configured to discharge voltage of the first capacitance element;
a switch connected to the first discharge element in series;
a second capacitance element connected to the switch;
a second discharge element connected to the second capacitance element in parallel and configured to discharge voltage of the second capacitance element,
wherein the switch is turned on in a case where the AC voltage is not input.

17. The discharge circuit according to claim 16;
wherein the switch is turned off in a case where the AC voltage is input.

18. A power supply which rectifies and smoothes AC voltage input from a commercial AC power supply and outputs voltage, the power supply comprising:
a rectifying unit which rectifies the input AC voltage;
a first capacitance element connected between the rectifying unit and an input portion for the AC voltage; and
a discharging circuit provided between the first capacitance element and the rectifying unit, wherein
the discharging circuit includes:
a first discharge element connected between the input lines and configured to discharge voltage of the first capacitance element;
a switch connected to the first discharge element in series;
a second capacitance element connected to the switch;
a second discharge element connected to the second capacitance element in parallel and configured to discharge voltage of the second capacitance element,
wherein the switch is turned on in a case where the AC voltage is not input.

19. The power supply according to claim 18;
wherein the switch is turned off in a case where the AC voltage is input.

20. An image forming apparatus comprising:
an image forming unit configured to form an image; and
a power source configured to supply power to the image forming apparatus,
wherein the power source is configured to output voltage of input AC voltage that is rectified and smoothed, and
wherein the power source includes:
a first capacitance element connected between the rectifying unit and an input portion for the AC voltage; and
a discharging circuit provided between the first capacitance element and the rectifying unit, wherein
the discharging circuit includes:
a first discharge element connected between the input lines and configured to discharge voltage of the first capacitance element;
a switch connected to the first discharge element in series;
a second capacitance element connected to the switch;
a second discharge element connected to the second capacitance element in parallel and configured to discharge voltage of the second capacitance element,
wherein the switch is turned on in a case where the AC voltage is not input.

21. The image forming apparatus according to claim 20;
wherein the switch is turned off in a case where the AC voltage is input.

* * * * *